US012039587B2

(12) United States Patent
Iyer et al.

(10) Patent No.: US 12,039,587 B2
(45) Date of Patent: Jul. 16, 2024

(54) METHODS AND APPARATUS FOR DETERMINING ITEM AFFINITIES ASSOCIATED WITH ONLINE CHAT SESSIONS

(71) Applicant: Walmart Apollo, LLC, Bentonville, AR (US)

(72) Inventors: Rahul Radhakrishnan Iyer, Sunnyvale, CA (US); Aysenur Inan, Mountain View, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 149 days.

(21) Appl. No.: 17/588,137

(22) Filed: Jan. 28, 2022

(65) Prior Publication Data
US 2023/0245198 A1    Aug. 3, 2023

(51) Int. Cl.
*G06Q 30/02* (2023.01)
*G06Q 30/0283* (2023.01)
*G06Q 30/0601* (2023.01)

(52) U.S. Cl.
CPC ..... *G06Q 30/0631* (2013.01); *G06Q 30/0283* (2013.01)

(58) Field of Classification Search
CPC .............. G06Q 30/0631; G06Q 30/0283
See application file for complete search history.

(56) References Cited

U.S. PATENT DOCUMENTS

| 7,756,879 | B2 |   | 7/2010  | Parsons et al.            |
|-----------|----|---|---------|---------------------------|
| 8,370,203 | B2 |   | 2/2013  | Dicker et al.             |
| 8,538,807 | B2 |   | 9/2013  | Dishneau et al.           |
| 9,773,268 | B2 |   | 9/2017  | Bonner et al.             |
| 9,817,846 | B1 | * | 11/2017 | Srinivasan ...... G06F 16/24578 |

(Continued)

FOREIGN PATENT DOCUMENTS

CN        107833117 B       3/2020

OTHER PUBLICATIONS

"Knowing What to Sell, When, and to Whom" (Kumar. V. et al.; Published Mar. 2006 in Harvard Business Review magazine and available online at https://hbr.org/2006/03/knowing-what-to-sell-when-and-to-whom ) (Year: 2006).*

(Continued)

*Primary Examiner* — James M Detweiler
(74) *Attorney, Agent, or Firm* — Morgan, Lewis & Bockius LLP; Manita Rawat

(57) ABSTRACT

In some examples, at least one processor executes instructions to, during a chat session, obtain, from a computing device of a first user, session data associated with the chat session and a first user, obtain a first set of data identifying a set of price drop items associated with the chat session, and obtain a second set of data identifying a set of attribute values associated with one or more attribute features of each item type. Based on the first set of data and the second set of data, a third set of data including affinity value data for each price drop item is generated. A fourth set of data identifying a set of items each with a score is obtained. A fifth set of data is then generated based on the third set of data and the fourth set of data.

14 Claims, 6 Drawing Sheets

(56) References Cited

U.S. PATENT DOCUMENTS

| | | | | |
|---|---|---|---|---|
| 10,068,284 B1* | 9/2018 | Zisk | ............... | G06F 3/04842 |
| 10,198,764 B2 | 2/2019 | Nihalani et al. | | |
| 10,304,082 B1* | 5/2019 | Bhagat | ............... | G06Q 30/0255 |
| 11,100,400 B2 | 8/2021 | Fang et al. | | |
| 11,580,585 B1* | 2/2023 | Rajana | ............... | G06Q 30/0202 |
| 2001/0021914 A1 | 9/2001 | Jacobi et al. | | |
| 2013/0290369 A1* | 10/2013 | Sayers | ............... | G06F 16/954 |
| | | | | 707/769 |
| 2014/0074649 A1* | 3/2014 | Patel | ............... | G06Q 30/0631 |
| | | | | 705/26.7 |
| 2018/0060696 A1 | 3/2018 | Chen et al. | | |

OTHER PUBLICATIONS

Wang, et al., "Personalized Embedding-based e-Commerce Recommendations at eBay", Proceedings of ACM Conference (Conference'17). ACM, New York, NY, USA, Jul. 2017 9 pages.

Rendle, et al., "BPR: Bayesian personalized ranking from implicit feedback", UAI '09: Proceedings of the Twenty-Fifth Conference on Uncertainty in Artificial IntelligenceJun. 2009 pp. 452-461.

Huang, et al., "A Graph Model for E-Commerce Recommender Systems" Journal of the American Society for Information Science and Technology, 2004, 55(3):259-274.

Ngaffo, et al., "A Bayesian Inference Based Hybrid Recommender System", IEEE Access, Jun. 2020, 8: 101682-101701.

* cited by examiner

METHODS AND APPARATUS FOR DETERMINING ITEM AFFINITIES ASSOCIATED WITH ONLINE CHAT SESSIONS

TECHNICAL FIELD

The disclosure relates generally to network services, and more specifically, to automatically determining, generating, and providing user profiles.

BACKGROUND

At least some ecommerce entities can include recommendation systems that can personalize a user experience for different channels, such as an ecommerce platform with a search engine system, provided by the ecommerce entity. Conventionally, the recommendation systems of an ecommerce entities generate recommendations based on information extracted from catalog data established by the ecommerce entity. Such conventional systems, may not take into account particular attributes of a user when generating such recommendations, and as such, may affect the recommendation-to-purchase rates (e.g., the rate at which users purchase items or products appearing in recommendations provided by the recommendation system) and may result in wasted computational resources in providing such recommendations (e.g., the recommendations are ignored).

In some examples, one of the channels may be a chat interface that enables users of an ecommerce platform to conduct on-line chat conversations or sessions with the corresponding ecommerce entity. Additionally, recommendation systems may provide recommendations through the chat interface. In some instances, the ecommerce entity may provide an online ecommerce platform, such as a website, along with the chat interface, to the users. In other instances, the ecommerce entity may provide a mobile application that executes on mobile computing devices of the users. The mobile application may include a chat interface that enables the users to conduct on-line chat conversations or sessions with the ecommerce entity. However, generally, such chat interfaces, either provided with the online ecommerce platform or with the associated mobile application, are limited in display size and generally are devoted a limited amount of computing resources.

SUMMARY

The embodiments described herein are directed to recommendation engine system associated with one or more channels of ecommerce entities, such as an online ecommerce platform with a search engine. As described herein a channel of the one or more channels may refer to a particular data process or pipeline, such as those associated with as search engine system of an online ecommerce platform of an ecommerce entity, a notification system, and/or a complementary item recommendation system. In accordance with various embodiments, exemplary computing systems may be implemented in any suitable hardware or hardware and software, such as in any suitable computing device. In some embodiments a system may include at least one processor and a memory storing instructions. In various examples, the at least one processor executes the instructions to, during a chat session, obtain, from a computing device of a first user, session data associated with the chat session and the first user. Additionally, the at least one processor executes the instructions to obtain a first set of data identifying a set of price drop items associated with the chat session, and obtain a second set of data associated with the first user. In some examples, the second set of data may identify a set of attribute values associated with one or more attribute features of each item type. Based on the first set of data and the second set of data, the at least one processor may execute the instructions to implement a first set of operations that generate a third set of data. In some examples, the third set of data may include affinity value data for each item of the set of price drop items. Moreover, the at least one processor executes the instructions to obtain a fourth set of data identifying a set of items and a score for each item of the set of items. In some examples, the score may characterize a likelihood the user will purchase the corresponding user during a future time interval. Further, the at least one processor may execute the instructions to, implement a second set of operations that generates a fifth set of data, based on the third set of data and the fourth set of.

In other embodiments, a computer-implemented method is provided that includes, during a chat session, obtaining, from a computing device of a first user, session data associated with the chat session and the first user. Additionally, the computer-implemented method includes obtaining a first set of data identifying a set of price drop items associated with the chat session, and obtaining a second set of data associated with the first user. In some examples, the second set of data may identify a set of attribute values associated with one or more attribute features of each item type. Based on the first set of data and the second set of data, the computer-implemented method may include implementing a first set of operations that generate a third set of data. In some examples, the third set of data may include affinity value data for each item of the set of price drop items. Moreover, the computer-implemented method may include obtaining a fourth set of data identifying a set of items and a score for each item of the set of items. In some examples, the score may characterize a likelihood the user will purchase the corresponding user during a future time interval. Further, the computer-implemented method may include implementing a second set of operations that generates a fifth set of data, based on the third set of data and the fourth set of.

In various embodiments, a non-transitory computer readable medium has instructions stored thereon, where the instructions, when executed by the at least one or more processors, cause a system to, during a chat session, obtain, from a computing device of a first user, session data associated with the chat session and the first user. Additionally, execution of the instructions by the at least one or more processors, further causes the system to obtain a first set of data identifying a set of price drop items associated with the chat session, and obtain a second set of data associated with the first user. In some examples, the second set of data may identify a set of attribute values associated with one or more attribute features of each item type. Moreover, execution of the instructions by the at least one or more processors, further causes the system to, based on the first set of data and the second set of data, implement a first set of operations that generate a third set of data. In some examples, the third set of data may include affinity value data for each item of the set of price drop items. Further, execution of the instructions by the at least one or more processor, further causes the system to obtain a fourth set of data identifying a set of items and a score for each item of the set of items. In some examples, the score may characterize a likelihood the user will purchase the corresponding user during a future time interval. Additionally, execution of the instructions by the at least one or more processors, further causes the system to implement a second set of operations that generates a fifth set of data, based on the third set of data and the fourth set of.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
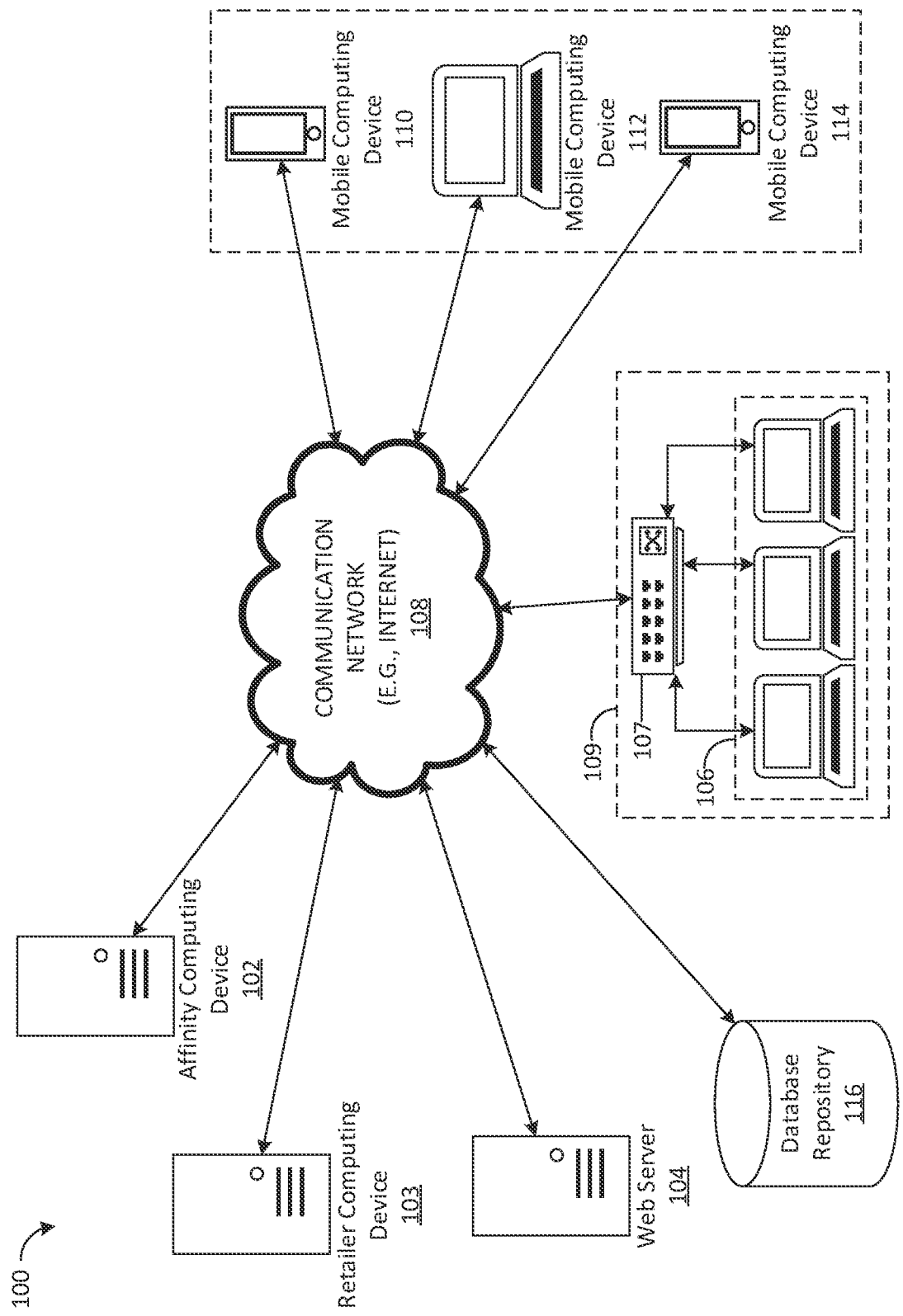
FIG. 1 is a block diagram of an example recommendation engine system that includes an affinity computing device.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

FIG. 1 illustrates a block diagram of an example recommendation engine system 100 that includes an affinity computing device 102 (e.g., a server, such as an application server), a retailer computing device 103, a web server 104, data repository 116, and multiple mobile computing devices 110, 112, and 114 operatively coupled over communication network 108. Affinity computing device 102, web server 104 and multiple mobile computing devices 110, 112, and 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 108.

In some examples, affinity computing device 102 and retailer computing device 103 can be a computer, a workstation, a laptop, a server such as a cloud-based server, or any other suitable device. In some examples, each of multiple mobile computing devices 110, 112, and 114 can be a cellular phone, a smart phone, a tablet, a personal assistant device, a voice assistant device, a digital assistant, a laptop, a computer, or any other suitable device. In some examples, affinity computing device 102 and a retailer computing device 103 may be operated by an ecommerce entity, such a s a retailer, and multiple mobile computing devices 110, 112, and 114 are operated by customers of the ecommerce entity and/or users of an online platform associated with the ecommerce entity.

Although FIG. 1 illustrates three mobile computing devices 110, 112, and 114, recommendation engine system 100 can include any number of mobile computing devices 110, 112, 114. Similarly, recommendation engine system 100 can include any number of affinity computing device 102, retailer computing device 103, web server 104, and data repository 116.

Workstation(s) 106 are operably coupled to communication network 108 via router (or switch) 107. Workstation(s) 106 and/or router 107 may be located at a store 109, for example. Workstation(s) 106 can communicate with affinity computing device 102 over communication network 108. The workstation(s) 106 may send data to, and receive data from, affinity computing device 102. For example, the workstation(s) 106 may transmit transaction data related to one or more orders purchased by customers (e.g., users or customers operating mobile computing devices 110, 112, 114) at store 109 to affinity computing device 102. In some examples, affinity computing device 102 may determine, in response to and based on the received transaction data, parse each of the one or more orders. Based on the parsed one or more orders, affinity computing device 102 may determine one or more items purchased in each of the one or more orders and a corresponding customer. Additionally, affinity computing device 102 may further identify an item type each of the one or more items are associated with. Further, affinity computing device 102 may store in data repository 116, data characterizing each of the one or more orders, the corresponding customer (e.g., by customer/user ID or visitor ID), the corresponding one or more items, and the associated item type within a corresponding data repository 116, such as transaction data.

In some examples, web server 104 hosts one or more web pages, such as an ecommerce entity's website. In some instances, the website may enable a customer to purchase items. In such instances, web server 104 may transmit transaction data related to orders purchased on the website by customers to affinity computing device 102. In some examples, affinity computing device 102 may, in response to and based on the received transaction data, parse each of the one or more orders. Based on the parsed one or more orders, affinity computing device may determine one or more items purchased in each of the one or more orders and a corresponding customer. Additionally, affinity computing device 102 may further identify an item type each of the one or more items are associated with. Further, affinity computing device 102 may store in data repository 116, data characterizing each of the one or more orders, the corresponding customer (e.g., by customer/user ID or visitor ID), the corresponding one or more items, and the associated item type within a corresponding data repository 116, such as transaction data.

In other examples, web server 104 transmits session data of each user of the online platform to affinity computing device 102. The session data identifies events associated with browser sessions and may include user interaction or engagement data characterizing events such as, add-to-cart events and click events. Web server 104 may also transmit search request data to affinity computing device 102. The search request data may identify a search query provided by a customer. In response to and based on receiving user session data, transaction data and/or search request data of a particular customer or user, affinity computing device 102 may generate, output data associated with that user, including affinity values for one or more item types, such as price drop items, associated with a retailer.

As described herein, a retailer may provide one or more items or products for customers (e.g., users of mobile computing device 110, 112, 114) to purchase. Additionally, each of the one or more items may be associated with or categorized by an item type. For example, apples and oranges may be associated with the item type, fresh fruits and vegetables, while a cola beverage or sparkling water may be associated with the item type, soda.

First mobile computing device 110, second mobile computing device 112, and $N^{th}$ mobile computing device 114 may communicate with web server 104 over communication network 108. For example, each of multiple mobile computing devices 110, 112, 114 may be operable to view, access, and interact with a website hosted by web server 104. In some examples, web server 104 hosts a website for a retailer that allows for the purchase of items. The website may further allow a customer to search for items on the website via, for example, a search bar. A customer operating one of multiple mobile computing devices 110, 112 may access the website and perform a search for items on the website by entering in one or more terms into the search bar. In response, the website may return search results identifying one or more items, as described above and further herein.

In various implementations, returned search results may include a graphical representation for each of the one or more items, and one or more interactive features that, when interacted with, triggers a one or more operations. For example, the interactive feature may enable the customer to add one or more of the items to an online shopping cart, and allow the customer to perform a "checkout" of the shopping cart to purchase the added items. In another example, the interactive feature may, when interacted with, cause the website to display additional information about the corresponding item. In other implementations, the graphical representations for each of the one or more items may be an interactive feature or have one or more interactive elements, that when interacted with, causes the website to display additional information regarding the corresponding items.

In some implementations, each of multiple mobile computing devices 110, 112, 114 may be operable to view, access, and interact with a chat interface. The chat interface may enable a customer of the ecommerce entity to conduct a conversation or chat session with a chat bot or a virtual assistant associated with the ecommerce entity over communication network 108. In some instances, web server 104 may provide a chat interface along with a website hosted by the web server 104. In other instances, the ecommerce entity may provide a mobile application to customers of the ecommerce entity that includes a chat interface. The chat interface may enable the customers conduct a conversation or chat session with a chat bot or a virtual assistant associated with the ecommerce entity over communication network 108.

Affinity computing device 102 is operable to communicate with data repository 116 over communication network 108. For example, affinity computing device 102 can store data to, and read data from, data repository 116. Data repository 116 can be a remote storage device, such as a cloud-based server, a disk (e.g., a hard disk), a memory device on another application server, a networked computer, or any other suitable remote storage. Although shown remote to affinity computing device 102, in some examples, data repository 116 can be a local storage device, such as a hard drive, a non-volatile memory, or a USB stick. Affinity computing device 102 may store purchase data received from store 109 and/or web server 104 in data repository 116. Affinity computing device 102 may also store user session data identifying events associated with browsing sessions, such as when a customer browses a website hosted by web server 104. In various examples, the user session data may include user interaction or engagement data characterizing events, such as, add-to-cart events, click events, and search query data. In some examples, data repository 116 stores one or more machine learning models that, when executed by affinity computing device 102, allow affinity computing device 102 to determine and generate output data associated with a particular user, including affinity values for one or more items associated with a retailer. In some implementations, the affinity values for the one or more items may each characterize a likelihood of an occurrence of a purchase event between that user and the corresponding item.

In some examples, the affinity values may be associated with price drop items. In such examples, affinity computing device 102 may obtain price drop item data generated by retailer computing device 103. Additionally, affinity computing device 102 may determine and generate affinity value data associated with each price drop item identified. In some instances, price drop item data may identify one or more items identified in catalog data of an ecommerce entity that is associated with a price drop event (e.g., a lowering of a price characterized in a corresponding item price data of the corresponding item) and the type of price drop event. In some examples, the price drop event may be associated with a particular time interval. For example, an ecommerce entity may lower a price of a set of items of a plurality of items identified in catalog data for a particular date, such as Nov. 1, 2021. As such, retailer computing device 103 may generate price drop item data that identifies the set of items as well as the time interval at which the lowered price may be valid or active for (e.g., 12 am to 11:59 pm on Nov. 1, 2021). In various instances, price drop item data may be updated periodically or in real-time, by retailer computing device 103 to reflect the most current set of items that have an associated active price drop event. Examples of type of price drop events include, a rollback type of price drop item, a clearance type of price drop item and a reduced price type of price drop item.

In other examples, affinity computing device 102 may generate affinity values for price drop items associated with a chat interface a particular user initiated, by determining and generating attribute value data associated with each price drop item identified in price drop item data. In such examples, affinity computing device 102 may obtain preference data of the particular user that includes attribute feature data and attribute value data. In various examples, attribute feature data characterizes attribute features associated with each of the items that the particular user has purchased, while attribute value data identifies an attribute value for each attribute feature identified in the attribute feature data. As described herein, an attribute value may characterize a likelihood the particular user may purchase a particular item or particular item type with a corresponding attribute feature.

Additionally, affinity computing device 102 may utilize price drop item data to identify one or more price drop items (e.g., an item identifier corresponding to each of the one or more price drop items) associated with a priced drop event and one or more attribute features of each of the one or more price drop items. In some examples, affinity computing device 102, may utilize catalog data to determine one or more attribute features associated with each of the one or more identified price drop items, such as item descriptions, item price, and/or item type, (e.g., based on matching item identifiers of each of the one or more items identified in the catalog data and the item identifiers of each of the one or more identified price drop items). Based on the identified attribute features of each of the one or more identified price drop items, the attribute features identified in the attribute feature data and the corresponding attribute values identified in the attribute value data, affinity computing device 102 may determine, for each attribute feature of the one or more identified price drop items, a corresponding attribute value.

Further, affinity computing device 102 may generate output data based on the attribute values of each attribute features of one or more price drop items identified in the price drop item data. For example, affinity computing device 102 may, for each of the one or more identified price drop items, generate an affinity value by aggregating each attribute value of each attribute feature of the particular price drop item. Additionally, affinity computing device 102 may generate output data that includes the generated affinity values of the one or more identified price drop items. In some examples, the affinity value of a particular identified price drop item may characterize a likelihood of an occurrence of a purchase event between a corresponding user and the corresponding identified price drop item.

In some implementations, the affinity values identified in the attribute value data may be based on one or more attributes extracted from transaction data, engagement data and/or search query data. In such implementations, affinity computing device 102 may obtain transaction data and engagement data associated with a particular customer/user (e.g., user or customer of mobile computing device 110, 112 or 114). Additionally, affinity computing device 102 may implement operations that generate, for each item type of a plurality of item types, attribute value data characterizing an attribute value. In such implementations, the operations to generate the attribute value data may include identifying a set of item types or category of items that a purchase event may be associated with. For example, affinity computing device 102 may extract, from transaction data of the user, data characterizing items that user may have purchased. Additionally, affinity computing device 102 may, based on the extracted data characterizing items the user may have purchased, determine an item type or category each of the items may be associated with.

In some examples, the operations to generate the attribute value data may further include extracting, from the transaction data, attribute feature data characterizing attribute features associated with each of the items that the user may have purchased. The attribute features may be associated with one or more preferences or user-type preferences. Examples of the user-type preferences include, but are not limited to, type preferences for various products, price sensitivity at a product/product-type level, brand sensitivity and brand preferences, restriction preferences, restricted foods preferences, dietary methods preferences, dietary needs preferences, allergens preferences, flavors preference, container types preferences, and quantity preferences.

In other examples, the operations to generate the attribute value data may include determining an attribute value for each attribute feature identified in the attribute feature data. In various implementations, the attribute value may characterize a likelihood the user may purchase a particular item or particular item type with a corresponding attribute feature. In such implementations, for a particular user, affinity computing device 102 may determine the attribute value of a particular attribute feature of one or more items of an item type based on the transaction data associated with that particular user. For example, affinity computing device 102 may identify, from transaction data associated with a first user, multiple purchase transactions. In such example, a subset of the multiple purchase transactions includes purchases for milk. Additionally, the data may further identify various attribute features associated with each milk purchase identified in the multiple purchase transactions. For instance, the attribute features associated with the milk purchases may include the brand, the type of milk (e.g., whole, fat free, 2%), flavor, (e.g., chocolate), restricted food preferences (e.g., organic), price, etc. Based at least on the frequency of the purchases of milk and the corresponding identified attribute features of each identified purchase event of milk, affinity computing device 102 may determine and generate an attribute value for each identified attribute feature that characterizes a likelihood the user may purchase milk with the corresponding identified attribute feature. In various implementations, the attribute value may indicate, for a particular item type, a strength of correlation between a purchase event of the user and a particular attribute feature (e.g., price).

In various examples, catalog data may be obtained from retailer computing device 103. In such examples, catalog data may identify a plurality of items a particular retailer may provide to a customer (e.g., a user/customer operating mobile computing device 110, 112, 114) for purchase. Additionally, catalog data may include, for each item of the plurality of items, data characterizing the corresponding item. Examples of such data include item ID, item brand, an item type, an item description, an item price and if applicable item options (e.g., a particular item may be sold in different colors and the item options may include data characterizing such color options).

In some examples, affinity computing device 102 may take into account whether the price drop items have been purchased before, when generating affinity values for the price drop items. In such examples, affinity computing device 102 may obtain previous purchase model (PPM) data. In some instances, the PPM data may be generated by retailer computing device 103. Additionally, PPM data may identify, for each user or customer associated with an online platform, such as a website of an ecommerce entity hosted by web server 104, one or more items (e.g., an item identifier corresponding to each of the one or more items) the associated customer previously purchased. Further, PPM data may include score data, characterizing a score for each of the one or more items. The score may characterize a likelihood of a purchase event (e.g., an actual purchase by the corresponding user) occurring of the corresponding item within a future interval.

In various examples, affinity computing device 102 may incorporate the score of an item identified in the PPM data to the affinity value of a matching price drop item. For example, affinity computing device 102 may obtain, for a user who initiated a chat interface at a particular time interval, PPM data associated with the user and output data associated with the chat interface. The output data may identify price drop items of a time interval (e.g., a price drop event) that corresponds to or is associated with the particular time interval. Based on the PPM data and the output data, affinity computing device 102 may obtain item identifiers of items in the PPM data and item identifiers of items in the output data and determine whether any of the item identifiers of the PPM data match any of the item identifiers in the output data. For the item identifiers that do match, affinity computing device 102 may boost or incorporate the corresponding affinity value characterized in the output data based on the corresponding score characterized in the PPM data, such that the affinity value is higher.

In some examples, affinity computing device 102 may update the output data based on the boosted affinity values. For example, for each price drop item that has an item identifier matching an identifier in the PPM data, affinity computing device 102 may update, within the output data, the corresponding affinity value with the corresponding boosted affinity value. In other examples, affinity computing device 102 may generate a second set of output data that includes the boosted affinity value of each price drop item that has an item identifier matching an identifier in the PPM data, along with the remaining price drop items in the output data that did not have an item identifier matching an identifier in the PPM data and associated affinity values.

In various implementations, affinity computing device 102 may generate recommendation notifications for user of an online platform based on the output data, the updated output data or second set of output data. In some examples, affinity computing device 102 may cause a chat interface associated with the online platform (e.g., on an associated mobile application executing on a computing device, such as computing device 110, 112, 114, of the user, or on a website of the ecommerce entity), to generate such recommendation notifications. In such examples, affinity computing device 102 may incorporate various parameters taking into account the limitations of the chat interface (e.g. the limited display size and limited amount of computing resources devoted to the chat interface). For instance, affinity computing device 102 may limit the number of content items associated with the price drop items identified in the output data to present with the recommendation notification. Additionally, affinity computing device 102 may select which price drop items and corresponding content items to present with the recommendation notification based on the corresponding affinity values.

For example, a recommendation notification may be limited to five price drop items and the corresponding content items. In such example, affinity computing device 102 may sort the price drop items identified in the output data, updated output data or second set of output data, based on the corresponding affinity scores. For instance, the price drop items identified in the output data, second output data or updated output data may be sorted in descending order based on the corresponding affinity value, with the price drop item with the largest affinity value first. Additionally, affinity computing device 102 may identify five price drop items with the five highest affinity values. Further, affinity computing device 102 may cause an application associated with the chat interface to generate and present a recommendation notification on the chat interface including content items associated with the five price drop items with the five highest affinity values. The content items may include a selectable or interactive feature, that when selected or interacted with, cause the associated price drop item to be added to an electronic cart.

In various implementations, affinity computing device 102 may generate recommendation notification data that includes an instruction. In examples where the chat interface is provided with a website hosted by web server 104, the instructions may cause the web server 104 to generate and present the recommendation notification on the chat interface in accordance with the instructions. In such examples, affinity computing device 102 may transmit the corresponding recommendation notification data to web server 104 over communication network 108. In examples where the chat interface is provided with a mobile application executing on a mobile computing device (e.g., mobile computing device 110, 112, 114) of a user, the instructions may cause the mobile application to generate and present the recommendation notification on the chat interface in accordance with the instructions. In such examples, affinity computing device 102 may transmit the corresponding recommendation notification data to the mobile application executing on the mobile computing device over communication network 108.

Figure 2:
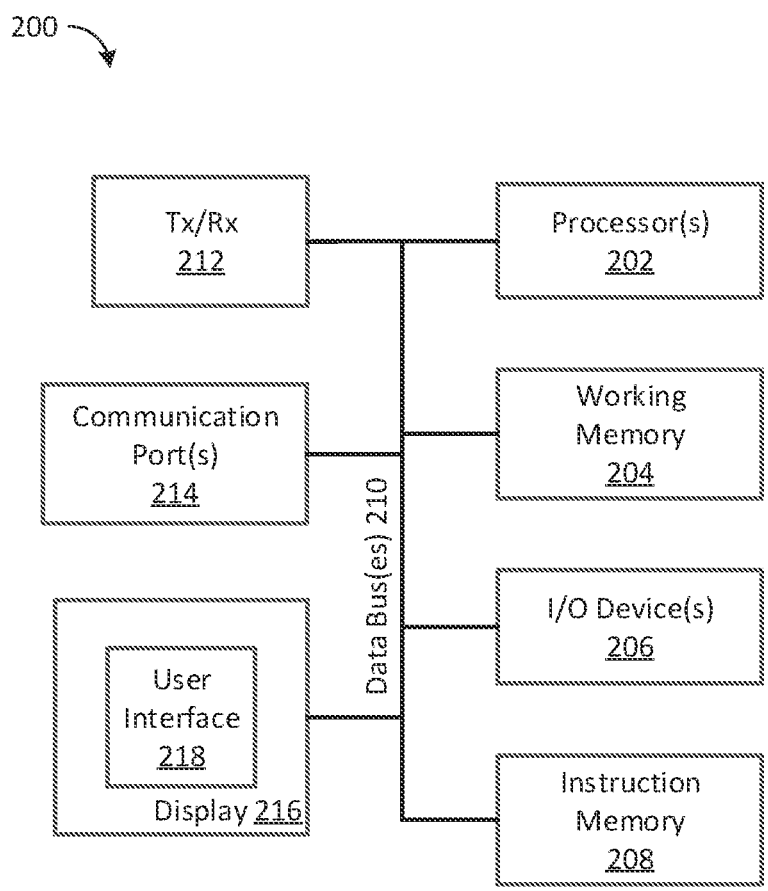
FIG. 2 illustrates a block diagram of example affinity computing device of FIG. 1 in accordance with some embodiments.

FIG. 2 illustrates a block diagram 200 of example affinity computing device 102 of FIG. 1. Affinity computing device 102 can include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 202 can be configured to perform a certain function or operation by executing code, stored on instruction memory 208, embodying the function or operation. For example, processors 202 can be configured to execute code stored in instruction memory 208 to perform one or more of any function, method, or operation disclosed herein.

Additionally, processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of affinity computing device 102. Working memory 204 can be a random access memory (RAM) such as a static random access memory (SRAM) or dynamic random access memory (DRAM), or any other suitable memory.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as interaction data, product data, and/or keyword search data.

Display 216 can display user interface 218. User interface 218 can enable user interaction with affinity computing device 102. For example, user interface 218 can be a user interface for an application of a retailer that allows a customer to view and interact with a retailer's website. In some examples, a user can interact with user interface 218 by engaging input/output devices 206. In some examples, display 216 can be a touchscreen, where user interface 218 is displayed on the touchscreen.

Transceiver 212 allows for communication with a network, such as the communication network 108 of FIG. 1. For example, if communication network 108 of FIG. 1 is a cellular network, transceiver 212 is configured to allow communications with the cellular network. In some examples, transceiver 212 is selected based on the type of communication network 108 affinity computing device 102 will be operating in. Processor(s) 202 is operable to receive data from, or send data to, a network, such as communication network 108 of FIG. 1, via transceiver 212.

Affinity Determinations for Price Drop Items

Figure 3:
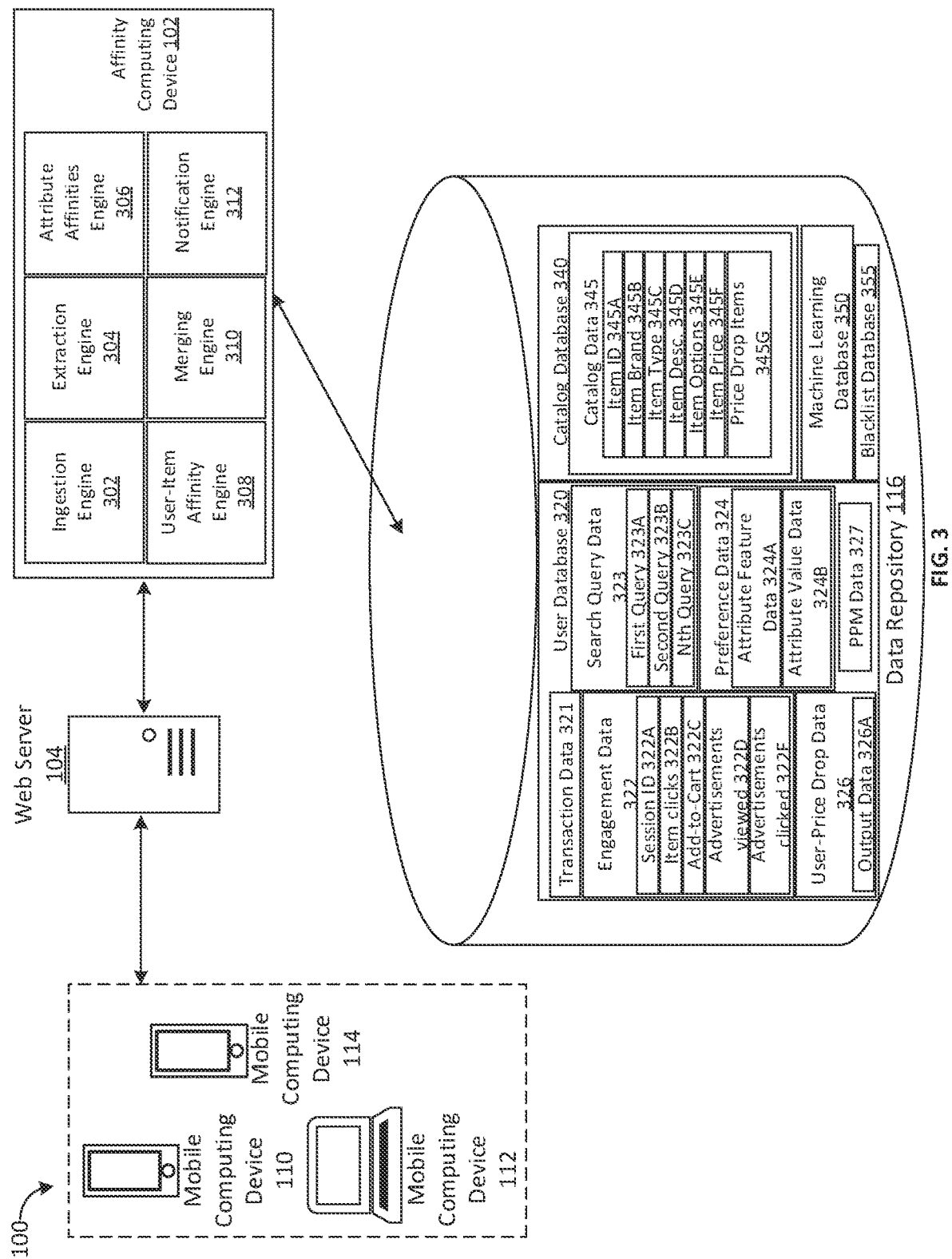
FIG. 3 is a block diagram illustrating examples of various portions of the affinity computing device of FIG. 1 in accordance with some embodiments.

FIG. 3 is a block diagram illustrating examples of various portions of the affinity computing device 102. As illustrated in FIG. 3, affinity computing device 102 can include ingestion engine 302, extraction engine 304, attribute affinities engine 306, user-item affinity engine 308, merging engine 310, and notification engine 312. In some examples, one or more of ingestion engine 302, extraction engine 304, attribute affinities engine 306, user-item affinity engine 308, merging engine 310, and notification engine 312 may be implemented in hardware. In other examples, one or more of ingestion engine 302, extraction engine 304, attribute affinities engine 306, user-item affinity engine 308, merging engine 310, and notification engine 312 may be implemented as an executable program maintained in a tangible, non-transitory memory, such as instruction memory 208 of FIG. 2, that may be executed by one or processors, such as processor 202 of FIG. 2.

Additionally, in various implementations, data repository 116 of FIG. 3, may include user database 320. Affinity computing device 102 may receive user session data from web server 104. Additionally, affinity computing device 102, may execute ingestion engine 302 to obtain one or more elements of user session data and store the one or more elements of user session data within user database 320. In some examples, user session data may be related one or more browsing sessions of a plurality of users of the online platform (e.g., the website hosted by web server 104). Additionally, user session data may include engagement data 322 and search query data 323. Item engagement data 322 includes a session ID 322A (i.e., a website browsing session identifier), item clicks 322B identifying items which the user clicked (e.g., images of items for purchase, keywords to filter reviews for an item), items added-to-cart 322C identifying items added to the user's online shopping cart, advertisements viewed 322D identifying advertisements the user viewed during the browsing session, advertisements clicked 322E identifying advertisements the user clicked on, and user ID 334 ID (e.g., a customer ID, retailer website login ID, visitor ID etc.). Search query data 323 identifies one or more searches conducted by a user during a browsing session (e.g., a current browsing session). In this example, search query data 323 includes first query 323A, second query 323B, and $N^{th}$ query 323C. Further, executed ingestion engine 302 may store in data repository 116, engagement data 322 and search query data 323 within a corresponding data repository 116, such as engagement data 322 and search query data 323 respectively.

User database 320 may also store user transaction data 321. In some example, affinity computing device 102 may receive in-store purchase data identifying and characterizing one or more purchases from one or more stores 109 associated with one or more user of the online platform. In other examples, affinity computing device 120 may receive online purchase data from web server 104, which identifies and characterizes one or more online purchases from an online platform, such as a retailer's website hosted by web server 104. The one or more online purchases may be associated with of one or more users of the online platform. In various implementations, affinity computing device 102 may obtain in store-purchase data and/or online purchase data of a particular time interval (e.g., a particular month, year, number of years, etc.) Executed ingestion engine 302 may parse in-store purchase data and online purchase data to generate transaction data 321 of the one or more users of the online platform within in user database 320. Further, executed ingestion engine 302 may store the transaction data 321 within a corresponding data repository 116, such as transaction data 321.

User database 320 may also store preference data 324 including attribute feature data 324A. In various implementations, affinity computing device 102 may execute extraction engine 304 to extract or obtain one or more attribute features of one or more items identified in transaction data 321 associated with a plurality of users of the online platform. Additionally, executed extraction engine 304 may store the extracted or obtained one or more attribute features of one or more items within data repository 116, such as attribute feature data 324A. In some examples, each of the one or more items may be associated with a particular item type of a plurality of item types. In other examples, each of the one or more items may be associated with a particular user of the plurality of users of the online platform. Moreover, user database 320 may also store preference data 324 including attribute value data 324B. In some implementations, affinity computing device 102 may execute attribute affinities engine 306 to generate attribute value data 324B characterizing an attribute value for each attribute feature of one or more items of each of a plurality of item types (as characterized by attribute feature data 324A). Executed attribute affinities engine 306 may store the attribute value data 324B within a corresponding data repository 116, such as attribute value data 324B.

User Database 320 may also store previous purchase model (PPM) data 327. In some examples, PPM data 327 may be obtained by affinity computing device 102 from retailer computing device 103. Additionally, affinity computing device 102 may execute ingestion engine 302 to obtain one or more elements of PPM data 327 and store such elements within a corresponding data repository 116, such as PPM data 327. In various examples, PPM data 327 may identify, for each user or customer associated with an online platform, such as a website of an ecommerce entity hosted by web server 104, one or more items (e.g., an item identifier corresponding to each of the one or more items) the associated customer previously purchased. Further, PPM data 327 may include score data identifying a score for each of the one or more items. The score may characterize a likelihood of a purchase event (e.g., an actual purchase by the corresponding user) occurring of the corresponding item within a future interval.

User database 320 may also store user-price drop data 326 including output data 326A. Output data 326A may include an affinity value for one or more items associated with an ecommerce entity. In some examples, the affinity values for the one or more items may each characterize a likelihood of an occurrence of a purchase event between a corresponding user and the corresponding item. In other examples, the affinity values may be associated with one or more price drop items of the ecommerce entity. In such examples, the affinity values may characterize a likelihood of an occurrence of a purchase event between a corresponding user and the corresponding identified price drop item.

Additionally, data repository 116 may further include catalog database 340. Catalog database 340 may store catalog data 345 obtained from retailer computing device 103. Additionally, catalog data 345 may identify one or more attributes of a plurality of items, such as a portion of or all items a retailer carries. Catalog data 345 may identify, for each of the plurality of items, an item ID 345A (e.g., an SKU number), item brand 345B, item type 345C (e.g., grocery item such as milk, clothing item), item description 345D (e.g., a description of the product including product features, such as ingredients, benefits, use or consumption instructions, or any other suitable description), item options 345E (e.g., item colors, sizes, flavors, etc.), and item price 345F. Further, affinity computing device 102 may execute ingestion engine 302 to obtain one or more elements of catalog data 345, such as item ID 345A, item brand 345B, item type 345C, item description 345D, item options 345E and item price 345F) and store such elements within a corresponding data repository 116, such as catalog data 345.

Catalog data 345 may include price drop item data 345G. In some implementations, affinity computing device 102 may obtain price drop item data 345G generated by retailer computing device 103. In some examples, price drop item data 345G may identify one or more items identified in catalog data 345 that are associated with a price drop event (e.g., a lowering of a price characterized in a corresponding item price data 345F of the corresponding item) and the type of price drop event. In other examples, the price drop event may be associated with a particular time interval. For example, an ecommerce entity may lower a price of a set of items of a plurality of items identified in catalog data for a particular date, such as Nov. 1, 2021. As such, retailer computing device 103 may generate price drop item data 345G that identifies the set of items as well as the time interval at which the lowered price may be valid for (e.g., 12 am to 11:59 pm on Nov. 1, 2021). In various examples, retailer computing device 103 may continuously, periodically or in real-time update price drop item data 345G. In such examples, catalog database 345 may include the most up to date price drop item data 345G (e.g., price drop item data 345G may include price drop items with associated price drop events of the most recent time interval, such as a time interval associated with a current time and or day). Examples of types of price drop events include, a rollback type of price drop item, a clearance type of price drop item and a reduced price type of price drop item.

In some examples, data repository 116 may include machine learning database 350. Machine learning database 350 may include machine learning data of one or more machine learning models. Additionally, the one or more machine learning models may be adaptively trained and validated. Affinity computing device 102 may execute the one or more adaptively trained and validated machine learning models to generate user-price drop data 326 including output data 326A associated with a particular user, including affinity values for each of one or more price drop items. In some implementations, the affinity values for each of the one or more price drop items may each characterize a likelihood of an occurrence of a purchase event between that user and the corresponding item.

In some examples, affinity computing device 102 may generate output data 326A associated with one or more price drop items, in response to the initiation of a chat interface (e.g., logging into the chat interface to initiate a conversation or chat session with a chat bot or a virtual assistant associated with the ecommerce entity over communication network 108) on a mobile computing device (e.g., mobile computing device 110, 112, 114) of a user/customer. In some examples, the chat interface may be provided by a website the user may view, access and interact with on the mobile computing device. In such examples, the website may be hosted by web server 104. In other examples, the chat interface may be generated by a mobile application executing on the mobile computing device. In such examples, initiation of the chat interface may cause the mobile computing device or web server 104 to transmit session data of the user that initiated the chat interface to affinity computing device 102. The session data may include a user identifier of the user who initiated the chat session and a timestamp. In various examples, the timestamp may be indicative of when the chat session was initiated.

In some examples, affinity computing device 102 may generate output data 326A based in part on one or more price drop items associated with a timestamp associated with an initiation of the chat interface. For example, affinity computing device 102 may execute user-item affinity engine 308 to obtain price drop item data 345G based on the timestamp associated with the initiation of the chat interface. In such an example, price drop item data 345G may identify one or more items identified in catalog data 345 that are associated with a price drop event (as herein also described price drop items) and a type of price drop event. Additionally, the price drop event may be associated with a time interval associated with the timestamp. For instance, the timestamp may indicate that a user may have initiated a chat interface on Nov. 1, 2021. As such, the items identified in the price drop item data 345G may be associated with a reduction in price event, a roll back event and/or a clearance event that includes Nov. 1, 2021.

In other examples, output data 326A may be based on preference data 324 associated with a particular user. In some implementations, affinity computing device 102 may generate a preference data 324 for each user of a plurality of users (e.g., users/customers operating mobile computing device 110, 112, 114) of an online platform, such as a website of a retailer hosted by web server 104. In such implementations, affinity computing device 102 may obtain transaction data 321 associated with a particular customer/user (e.g., user or customer of mobile computing device 110, 112 or 114). Additionally, affinity computing device 102 may execute attribute affinities engine 306 to implement a first set of operations that generate, for each item type of a plurality of item types, attribute value data 324B characterizing an attribute value. In some examples, the first set of operations may include identifying a set of item types or category of items that a purchase event may be associated with. For example, affinity computing device 102 may execute attribute affinities engine 306 to obtain from user database 320, transaction data 321 associated with a user (e.g., user of mobile computing device 110). Additionally, executed attribute affinities engine 306 may extract, from transaction data 321 of the user, data characterizing items that user may have purchased. Additionally, executed attribute affinities engine 306 may, based on the extracted data characterizing items the user may have purchased, determine an item type or category each of the items may be associated with.

In other examples, the first set of operations may include, extracting, from the transaction data 321 of the user, attribute feature data 324A characterizing attribute features associated with each of the items that the user may have purchased. In various implementations, the attribute features may be associated with one or more user-type preferences. In such implementations, the attribute feature data 324A may indicate which of the preferences or user-type preferences each of the extracted attribute features are associated with. Examples of the user-type preferences include, but are not limited to, type preferences for various products, price sensitivity at a product/product-type level, brand sensitivity and brand preferences, restriction preferences, restricted foods preferences, dietary methods preferences, dietary needs preferences, allergens preferences, container types preferences, and quantity preferences. Additionally, or alternatively, in some implementations, the attribute feature data 324 may indicate the item type each of the extracted attribute features are associated with.

In various examples, the first set of operations may include generating, for each item type, attribute value data 324B based on attribute feature data 324A. Attribute value data 324B may include an attribute value for each attribute feature identified in attribute feature data 324A associated with the user. Additionally, the attribute value may characterize a likelihood the user may purchase a particular item or particular item type with a corresponding attribute feature. In such implementations, for a particular user, executed attribute affinities engine 306 may determine the attribute value of a particular attribute feature of one or more items of an item type based on the attribute feature data 324B and transaction data 321 associated with that particular user. In some example, executed attribute affinities engine 306 may identify, from transaction data 321 associated with the user and attribute feature data 324A associated with transaction data 321, the frequency at which different items are being purchased, their corresponding attribute features and item types. Based at least on the frequency of the items being purchased, their corresponding attribute features and item types, executed attribute affinities engine 306 may determine and generate, for each item type, an attribute value for each identified attribute feature. In various implementations, the attribute value may indicate, for a particular item type, a strength of correlation between a purchase event of the user and a corresponding attribute feature (e.g., price).

For example, executed attribute affinities engine 306 may utilize the transaction data 321 and attribute feature data 324A to determine, for a particular user, a subset of the multiple purchase transactions includes purchases for milk. Additionally, based on the transaction data 321 and attribute feature data 324A, executed attribute affinities engine 306 may determine various attribute features associated with each milk purchase identified in the multiple purchase transactions. For instance, the attribute features associated with the milk purchases may include the brand, the type of milk (e.g., whole, fat free, 2%), flavor, (e.g., chocolate), restricted food preferences (e.g., organic), price, etc. Based at least on the frequency of the purchases of milk and the corresponding identified attribute features of each identified purchase event of milk, executed attribute affinities engine 306 may determine and generate, for item type "milks," an attribute value for each identified attribute feature. In some examples, the attribute value may characterize a likelihood the user may purchase an item associated with the item type "milks" with the corresponding identified attribute feature, such as "organic". In various implementations, the attribute value may indicate, for a particular user and for item type "milks," a strength of correlation between a purchase event of an item associated with item type "milks" and a particular attribute feature (e.g., price).

In some examples, affinity computing device 102 may execute user-item affinity engine 308 to obtain preference data 324 associated with the particular user, based on the user identifier associated with the initiation of the chat interface. Additionally, executed user-item affinity engine 308 may determine affinity values associated with the price drop items identified in price drop item data 345G associated with the timestamp of the initiation of the chat interface, based on the preference data 324 associated with the corresponding user identifier associated with the initiation of the chat interface and price drop item data 345G associated with a timestamp associated with the initiation of the chat interface. In various implementations, executed user-item affinity engine 308 may determine affinity values associated with the price drop items identified in price drop item data 345G associated with the timestamp of the initiation of the chat interface, by applying a trained and validated machine learning model to the preference data 324 and price drops item data 345G.

In various implementations, executed user-item affinity engine 308 may perform operations that adaptively train a machine-learning or artificial-intelligence process or model to determine affinity values for each price drop item identified in price drop item data 345G. Additionally, executed user-item affinity engine 308 may adaptively train the machine-learning or artificial-intelligence model using training data sets associated with a first prior temporal interval (e.g., a "training" interval), and validates the trained machine-learning or artificial-intelligence process using validation datasets associated with a second, and distinct, prior temporal interval. In some examples, the training dataset may be obtained from the attribute feature data 324A and corresponding attribute value data 324B, price drop item data 345G, and catalog data 345. Additionally, the obtained data elements of the attribute feature data 324A and corresponding attribute value data 324B, price drop item data 345G, may be of a first prior temporal interval. In other examples, validation dataset may be obtained from the attribute feature data 324A and corresponding attribute value data 324B, price drop items dat 345G, and catalog data 345. Additionally, the obtained data elements of the attribute feature data 324A and corresponding attribute value data 324B, price drop item data 345G may be of a second and distinct prior temporal interval. In such examples, executed user-item affinity engine 308 may validate the predictive capability and accuracy of the trained machine learning model based on the validation dataset or one or more validation parameters (e.g., computed precision values, computed recall values, and computed area under curve (AUC) for receiver operating characteristic (ROC) curves or precision-recall (PR) curves).

Referring back to FIG. 3, in some examples, executed user-item affinity engine 308 may apply the trained and validated machine learning model to identify, based on catalog data 345 associated with each price drop item identified in price drop item data 345G associated with the timestamp of the initiation of the chat interface, attribute features for each of the price drop items. Additionally, based on the attribute feature data 324A and corresponding attribute value data 324B of preference data 324 of the user and the determine attribute feature for each of the price drop items, the trained and validated machine learning model may determine attribute values for each attribute feature associated with each of the price drop items.

For example, preference data 324, including attribute feature data 324A and corresponding attribute value data 324B, associated with a first user, may include data elements identifying a first attribute feature associated with a first brand and corresponding first attribute value, a second attribute feature associated with a first item type and corresponding second attribute value, and a third attribute feature associated with a second item type and corresponding third attribute value. Additionally, the determined attribute features of a first price drop item identified in the price drop item data 345G may include a fourth attribute feature, a fifth attribute feature and a sixth attribute feature. Moreover, the trained and validated machine learning model may determine whether any of the identified attribute features of preference data 324 match the determined attribute features of the price drop items identified in price drop item data 345G associated with the timestamp associated with an initiation of a chat interface. In such an example, the trained and validated machine learning model may determine whether the first attribute feature, second attribute feature or third attribute feature may match any of the fourth attribute feature, fifth attribute feature or sixth attribute feature of the first price drop item. If there is a match, the trained and validated machine learning model may determine that the corresponding affinity value of the matched attribute feature of the preference data 324 may be associated with the determined attribute feature of the price drop item of the price drop item data 345G. Following the example, if the trained and validated machine learning model determines the first attribute feature of preference data 324 of the user matches the fifth attribute feature of the first price drop item, then the trained and validated machine learning model may associate the attribute value of the first attribute feature to the fifth attribute feature.

In various implementations, output data 326A may be based on the attribute values of each attribute feature of price drop items identified in price drop item data 345G associated with a timestamp of the initiation of a chat interface. In such implementations, the trained and validated machine learning model may generate an affinity value for each of the price drop items identified in the price drop item data 345G by aggregating each attribute value of each attribute feature of the particular price drop item in accordance with the following equation:

$$S(u,i)=\Sigma_{j\in A(i)} w_{uj} R(u,j|i) \quad \text{(eq. 1)}$$

where R (u,j|i) is the attribute value for user u and attribute j for given price drop item i;
S(u, i) is the affinity value between user u and item I;
A(i) is the attribute space for item i (brand, flavor, allergens etc.);

$W_{uj}$ is the attribute importance weight of attribute j for user u.

As noted in the equation 1, the aggregated attribute value of each attribute feature of the particular price drop item may be based on a weighting of each attribute value of the associated attribute features. In some implementations, executed user-item affinity engine 308 may utilize search query data 323 to determine the weightings of each attribute feature of an item type. For example, executed user-item affinity engine 308 may obtain attribute value data 324B corresponding to a particular price drop item of a particular user (e.g., customer/user of mobile computing device 110, 112, 114). Additionally, executed user-item affinity engine 308 may obtain search query data 323 and engagement data 322 associated with the user to generate attribute relevance data. Attribute relevance data may characterize a weighting or a percentage change of an attribute value of an attribute feature (e.g., $w_{uj}$). The engagement data 322 and search query data 323 of a user may indicate which attribute features are more relevant or important to the user. For example, based on search query data 323 and engagement data 322, executed user-item affinity engine 308 may parse through each search query session that the user has initiated (e.g., first query 323A, second query 323B, Nth query 323C) and determine which of the corresponding search results resulted in a particular item being added to cart (e.g., add to cart 322C). Additionally, for each item added to cart that stemmed from a search query, executed user-item affinity engine 308 may identify associated attribute features. Based at least on a comparison between the frequency of different items within the same item type were added to cart, executed attribute affinities engine 306 may determine which of the attribute features may be important to the user. Such determinations may be the basis of the weightings.

For instance, based on search query data 323 and engagement data 322, attribute affinities engine 306 may identify, for item type "milk," search queries that eventually resulted in milk related items being added to cart—first milk item, second milk item, third milk item, and fourth milk item. Additionally, executed attribute affinities engine 306 may determine attribute features for each milk related item. For example, for first milk item, executed attribute affinities engine 306 may determine that attribute feature associated to brand preference may be "great value," while the attribute feature associated to preference type is "2%"; for second milk item, executed attribute affinities engine 306 may determine that attribute feature associated to brand preference may be "great value," while the attribute feature associated to preference type is "whole"; for third milk item, executed attribute affinities engine 306 may determine that attribute feature associated to brand preference may be "great value," while the attribute feature associated to preference type is "organic, whole"; for fourth milk item, executed attribute affinities engine 306 may determine that attribute feature associated to brand preference may be "horizon," while the attribute feature associated to preference type is "organic, whole"; and for fifth milk item, executed attribute affinities engine 306 may determine that attribute feature associated to brand preference may be "great value," while the attribute feature associated to preference type is "chocolate." Based at least on a comparison between the frequency of each of the milk items that were added to cart, executed attribute affinities engine 306 may determine which attribute feature may be weighted more. For example, following the example, executed attribute affinities engine 306 may at least determine that attribute feature associated to brand preference "great value" may be weighted more.

In various implementations, executed user-item affinity engine 308 may generate output data 326A that includes the generated affinity values of the one or more identified price drop items. In some examples, the affinity value of a particular identified price drop item may characterize a likelihood of an occurrence of a purchase event between a corresponding user and the corresponding identified price drop item.

In some implementations, affinity computing device 102 may take into account whether price drop items of output data 326A have been purchased previously. In some instances, the output data 326A may be based on price drop item data 345G associated with a timestamp of the initiation of a chat interface. In such implementations, affinity computing device 102 may execute merging engine 310 to determine whether any of the price drop items identified in output data 326A have been previously purchased. For any price drop items identified in output data 326A that have been previously purchased, executed merging engine 310 may boost or adjust the associated affinity values. For example, executed merging engine 310, may obtain an identifier of a user who initiated a chat interface (e.g., logging into the chat interface to initiate a conversation or chat session with a chat bot or a virtual assistant associated with the ecommerce entity over communication network 108). Additionally, executed merging engine 310 may obtain previous purchase model (PPM) data 327 associated with the user, based on the identifier of the user. In various examples, PPM data 327 may identify, for each user or customer associated with an online platform, such as a website of an ecommerce entity hosted by web server 104, one or more items (e.g., an item identifier corresponding to each of the one or more items) the associated customer previously purchased. In some examples, PPM data 327 may include attribute feature data (e.g., based on catalog data 345, such as, item ID 345A, item brand 345B, item type 345C, item description 345D, item options 345E, and item price 345F) Further, PPM data 327 may include score data, characterizing a score for each of the one or more items. The score may characterize a likelihood of a purchase event (e.g., an actual purchase by the corresponding user) occurring of the corresponding item within a future interval. Moreover, executed merging engine 310 may determine whether any of the price drop items identified in output data 326A are identified in PPM data 327. For instance, executed merging engine 310 may determine whether any of the price drop items identified in output data 326A are identified in PPM data 327 by comparing the determined attribute features, such as item ID data 345A, of each price drop item identified in output data 326A with the attribute features of attribute feature data, such as item ID data 345A, of each item identified in PPM data 327). Further, for any price drop items identified in output data 326A that match the items identified in PPM data 327, executed merging engine 310 may boost or adjust affinity values associated with price drop items that have matched to items identified in PPM data 327.

In some examples, executed merging engine 310 may boost or adjust the affinity value of a price drop item that has matched to an item identified in PPM data 327 based on score data associated with the item identified in PPM data 327 that matches the price drop item. In some implementations, executed merging engine 310 may update affinity values of price drop items identified in output data 326A of a user that have matched to items identified in PPM data 327 of the user based on score data of the corresponding matching item identified in PPM data 327. In other implementations, executed merging data 310 may generate a second set of output data 326A (not shown in FIG. 3) including the boosted or adjusted affinity value of each price drop item identified in output data 326A that matches an item in PPM data 327. In such implementations, the second set of output data 326A may further identify the remaining price drop items in the output data 326A that did not have a matching item identified in PPM data 327, and may further include associated affinity value.

Affinity computing device 102 may utilize output data 326A (or alternatively, updated output data 326A or second set of output data 326A) when causing a chat interface to generate recommendation notifications including content items associated with one or more of the price drop items identified in output data 326A (or alternatively, updated output data 326A or second set of output data 326A). In some examples, affinity computing device 102 may execute notification engine 312 to generate notification data including instructions that cause presentation of the recommendation notifications on the chat interface based on output data 326A. For example, based on the price drop items identified in output data 326A, executed notification engine 312 may generate notification including instructions that specify content items associated with one or more of the price drop items identified in output data 326A should be generated and presented. The content items may include a selectable or interactive feature, that when selected or interacted with, cause the associated price drop item to be added to an electronic cart.

In example where the chat interface is provided on a website hosted by web server 104, executed notification engine 312 may transmit the notification data, over communication network 108, to the web server 104. Web server 104 may utilize the notification data to generate the recommendation notification on the chat interface in accordance to the instructions included in the notification data. Additionally, or alternatively, in examples where the chat notification is provided by a mobile application executing on a mobile computing device (e.g., mobile computing device 110, 112, 114) of a user, executed notification engine 312 may transmit the notification data, over communication network 108, to the mobile application. The mobile application may utilize the notification data to generate the recommendation notification on the chat interface in accordance to the instructions included in the notification data.

Due to limitations associated with a chat interface, such as the limitations in display size and/or computing resources devoted to the chat interface, executed notification engine 312 may select a subset of price drop items identified output data 326A (or alternatively, updated output data 326A or second set of output data 326A) based on one or more parameters associated with such limitations. In various implementations, the one or more parameters may be defined by an operator of retailer computing device 103. In some examples, the one or more parameters may include a parameter limiting a number of or identifying a predetermined number of price drop items and associated content items to include in a recommendation notification. In such examples, executed notification engine 312 may sort the price drop items identified in output data 326A based on the associated affinity values of each of the price drop items identified in output data 326A. For example, executed notification engine 312 may sort the identified price drop items in descending order of affinity values with the price drop item with the largest affinity value first.

Additionally, based on a parameter identifying a predetermined number of price drop items that are to be included in a recommendation notification, executed notification engine 312 may select and identify the top number of highest affinity valued price drop items in accordance to the parameter. For example, if the parameter indicates that the predetermined number is five, then executed notification engine 312 may select and identify the top five highest affinity valued price drop items of output data 326A (or alternatively, updated output data 326A or second set of output data 326A). Further, executed notification engine 312 may generate notification data that includes instructions to generate a recommendation notification with content items of the subset of price drop items identified in output data 326A. Following the example above, the notification data, generated by executed notification engine 312, may include instructions to generate a recommendation notification with content items associated with the top five highest affinity valued price drop items of output data 326A. The content items may include a selectable or interactive feature, that when selected or interacted with, cause the associated price drop item to be added to an electronic cart.

In some examples, executed notification engine 312 may introduce diversity into a selection of price drop items identified in output data 326A (or alternatively, updated output data 326A or second set of output data 326A) that are to be included in a recommendation notification. Additionally, executed notification engine 312 may obtain one or more notification parameters related to diversity. For example, a notification parameter related to diversity may indicate that a recommendation notification may only include a predetermine number of price drop items per item type or for a particular one or more item types. In such examples, executed notification engine 312 may sort the price drop items identified in output data 326A (or alternatively, updated output data 326A or second set of output data 326A) based on the associated affinity values of each of the price drop items identified in output data 326A (or alternatively, updated output data 326A or second set of output data 326A). For example, executed notification engine 312 may sort the identified price drop items in descending order of affinity values with the price drop item with the largest affinity value first. Additionally, each identified price drop item may include an attribute feature associated with an item type or category. Additionally, based on the parameter indicating that a recommendation notification may only include a predetermine number of price drop items per item type or for a particular one or more item types, executed notification engine 312 may select and identify the top number of highest affinity valued price drop items per item type or for a particular one or more item types in accordance to the parameter.

For example, output data 326A (or alternatively, updated output data 326A or second set of output data 326A) may include twenty price drop items sorted in descending order of associated affinity values, with the price drop item with the highest affinity value first, while the parameter may indicate that the recommendation notification may only include two price drop items per item type. Executed notification engine 312 may parse through and analyze the sorted price drop items of output data 326A to determine the item types of each price drop item. Additionally, executed notification engine 312, may go down the sorted and identified price drop items to select the price drop items in accordance with the parameter. For instance, executed notification engine 312 may determine that price drop item A with the highest affinity value is associated with a first item type, milk, and selects price drop item A and associated content items to be included in the recommendation notification. Additionally, executed notification engine 312 may determine that price drop item B with the second highest affinity value is associated with a first item type, milk, and selects price drop item B and associated content items to be included in the recommendation notification. Moreover, executed notification engine 312 may determine that price drop item C with the third highest affinity value is associated with a first item type, milk. Since the parameter limits the selection of a price drop item type of each item type to two, executed notification engine 312 may ignore price drop item C. Further, if the next price drop item is of a different item type, such as fruits and vegetables, then executed notification engine 312 may select that price drop item and associated content item for the recommendation notification. Otherwise, if the next price drop item is of the item type, the first item type, milk, then executed notification engine 312 may again ignore that price drop item. Based on the selected identified price drop items, executed notification engine 312 may generate notification data that includes instructions to generate a recommendation notification with content items of the subset of selected price drop items identified in output data 326A. Following the example above, the notification data, generated by executed notification engine 312, may include instructions to generate a recommendation notification with at least content items associated with the price drop item A, and price drop item B. The content items may include a selectable or interactive feature, that when selected or interacted with, cause the associated price drop item to be added to an electronic cart.

In some implementations, executed notification engine 312 may take into account whether a user has previously rejected a price drop item identified in output data 326A (or alternatively, updated output data 326A or second set of output data 326A), when generating an instruction included in notification data. In such implementations, executed notification engine 312 may obtain blacklist data from black list database 355. Blacklist data may identify, for each user of a plurality of users of an online platform, one or more items, such as price drop items, that were previously presented in a previously generated recommendation notification and associated with a rejection event. In some examples, the rejection event may include one or more instances, the corresponding user ignored the recommendation notification for a predetermined amount of time or logged off before without interacting or selecting with a content item associated with the particular item, such as an interactive or selectable feature associated with the particular item. In other examples, the rejection event may be associated with an explicit rejection of the item, such as the corresponding user interacting or selecting with an interactive or selectable feature associated with rejecting the particular item.

Additionally, blacklist data may include time data associated with each of the one or more items. The time data may characterize a time interval the particular item may not be included in output data 326A (or alternatively, updated output data 326A or second set of output data 326A). Additionally, the time interval may be based on the time and/or date of the occurrence of the rejection event. For example, a first user of an online platform, may, through a mobile application executing on a mobile computing device (e.g., mobile computing device 110, 112, 114) operated by the user, initiate a chat interface associated with an ecommerce entity on Nov. 15, 2021 at 11:30 AM PST. Additionally, in response to the initiation of the chat interface, affinity computing device 102 may generate output data 326A and a recommendation notification based on output data 2326A as described herein. In response to the generated and presented recommendation notification on the chat interface, the user rejects at least a first price drop item and associated content items included with the recommendation notification. The mobile computing device of the user may transmit response data, to notification engine 312, characterizing that particular rejection event including a timestamp associated with the occurrence of the rejection event. Executed notification engine 312 may obtain the response data and determine a time interval associated with that particular rejection event. Additionally, executed notification engine 312 may update blacklist data stored in blacklist database 335 to include data, associated with the first user, identifying the first price drop item along with data characterizing the determined time interval associated with the timestamp of the rejection event associated with the first price drop item. In various implementations, affinity computing device 102 may periodically or in real-time update the blacklist data of rejection events and corresponding rejection items associated with each user of the online platform.

Moreover, based on the blacklist data and output data 326A (or alternatively, updated output data 326A or second set of output data 326A) associated with an initiated of a chat interface by a particular user, executed notification engine 312 may determine price drop items that are also identified in the blacklist data. Additionally, executed notification engine 312 may determine whether to remove price drop items that are identified in both blacklist data as well as the output data 326A based on time data associated with the price drop items that are identified in both blacklist data as well as output data 326A. For example, affinity computing device 102 may obtain session data indicating a user identifier of a first user that initiated a chat interface and a timestamp associated with an initiation of the chat interface. Additionally, affinity computing device 102 may generate output data 326A associated with the session data, as described herein. Moreover, based on the blacklist data and output data 326A associated with the initiated chat interface, executed notification engine 312 may determine price drop item A and price drop item B identified in output data 326A are also identified in the blacklist data. Based on the time data associated price drop item A and price drop item B and the timestamp associated with the initiation of the chat interface, executed notification engine 312 may determine whether the timestamp is within a time interval associated with price drop item A and price drop item B. If the timestamp is within the time interval of price drop item A and/or price drop item B, executed notification engine 312 may update output data 326A by removing price drop item A and price drop item B from output data 326A. Alternatively, if the timestamp is not within the time interval of price drop item A and/or price drop item B, executed notification engine 312 may leave output data 326A as is.

In some examples, executed notification engine 312 may determine whether the price drop items identified in output data 326A (or alternatively, updated output data 326A or second set of output data 326A) are also identified in blacklist data by comparing attribute features associated the price drop items identified in output data 326A and the attribute features of items identified in the blacklist data. In such examples, executed notification engine 312 may obtain the determined attribute features of the price drop items identified in output data 326A as described herein. Additionally, executed notification engine 312 may obtain, from catalog data 345, attribute feature data of the items identified in blacklist data. The attribute feature data may characterize one or more attribute features of the items identified in the blacklist data.

In other implementations, executed notification engine 312 may take into account items already added to an electronic cart of an online platform. In such implementations, a user may have initiated a browser session, either on a website hosted by web server 104 or on a mobile application executing on a mobile computing device (e.g., mobile computing device 110, 112, 114) operated by the user, and the user may have started to add items to an electronic cart. Additionally, prior to the user implementing "check out" out procedures with the items added to the electronic cart, the user may initiate a chat interface. Moreover, executed notification engine 312 may obtain cart data identifying the items added to the electronic cart, and utilize such data to determine whether to remove price drop items identified in output data 326A (or alternatively, updated output data 326A or second set of output data 326A) associated with the initiated chat interface that also are identified in the cart data. For instance, if the price drop items identified in output data 326A are also identified in the cart data, then executed notification engine 312 may remove such price drop items from the output data 326. Otherwise, executed notification data 312 may leave output data 326A as is.

For example, at a first time interval, a first user may have initiated a browser session, either on a website hosted by web server 104 or on a mobile application executing on a mobile computing device (e.g., mobile computing device 110, 112, 114) operated by the first user, and the user may have started to add a first item and a second item to an electronic cart. Cart data may be generated, either by web server 104 or the mobile application executing on computing device of the first user. Cart data may include, data identifying a first item and a second item added to an electronic cart during the browser session along with data identifying the first user (e.g., user identifier of the first user). Additionally, web server 104 and/or mobile application, may transmit, over communication network 108 and to affinity computing device 102, the cart data. In such example, the first user does not trigger "check out" procedures for the items added to the electronic cart.

In a second time interval, the first user initiates a chat interface, either on the website hosted by web server 104 or on the mobile application executing on a mobile computing device (e.g., mobile computing device 110, 112, 114) operated by the first user. The web server 104 or mobile computing device may transmit user session data, over communication network 108, to affinity computing device 102. Affinity computing device 102 may generate output data 326A associated with the session data and the first user, as described herein. Additionally, affinity computing device 102 may obtain cart data associated with output data 326A (or alternatively, updated output data 326A or second set of output data 326A) and the first user, based on the first user identifier included with the session data and the cart data. Moreover, based on the cart data and output data 326A associated with the initiated chat interface, executed notification engine 312 may determine, for the first user, whether price drop item A and price drop item B identified in output data 326A match the first item and the second item identified in the cart data. If price drop item A matches the first item and/or the second item, executed notification engine 312 may update output data 326A by removing price drop item A from output data 326A (or alternatively, updated output data 326A or second set of output data 326A). Otherwise, executed notification data 312 may leave output data 326A as is. If price drop item B matches the first item and/or the second item, executed notification engine 312 may update output data 326A (or alternatively, updated output data 326A or second set of output data 326A) by removing price drop item B from output data 326A. Otherwise, executed notification data 312 may leave output data 326A as is.

In some examples, executed notification engine 312 may determine whether the price drop items identified in output data 326A (or alternatively, updated output data 326A or second set of output data 326A) are also identified in cart data by comparing attribute features associated the price drop items identified in output data 326A and the attribute features of items identified in the cart data. In such examples, executed notification engine 312 may obtain the determined attribute features of the price drop items identified in output data 326A as described herein. Additionally, executed notification engine 312 may obtain, from catalog data 345, attribute feature data of the items identified in cart data. The attribute feature data may characterize one or more attribute features of the items identified in the cart data.

Methodology

Figure 4:
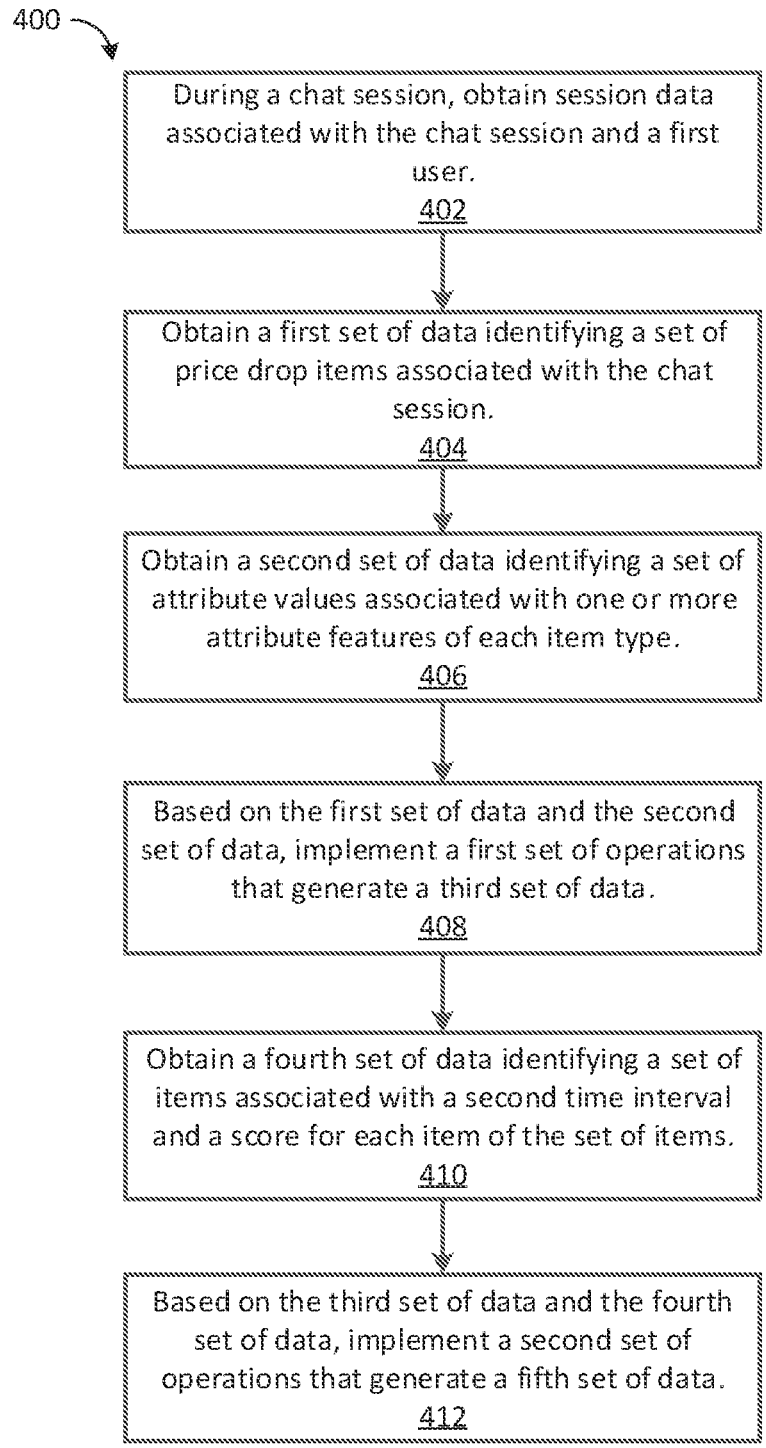
FIG. 4 illustrates an example method that can be carried out by the affinity computing device 102 of FIG. 1.
Figure 5:
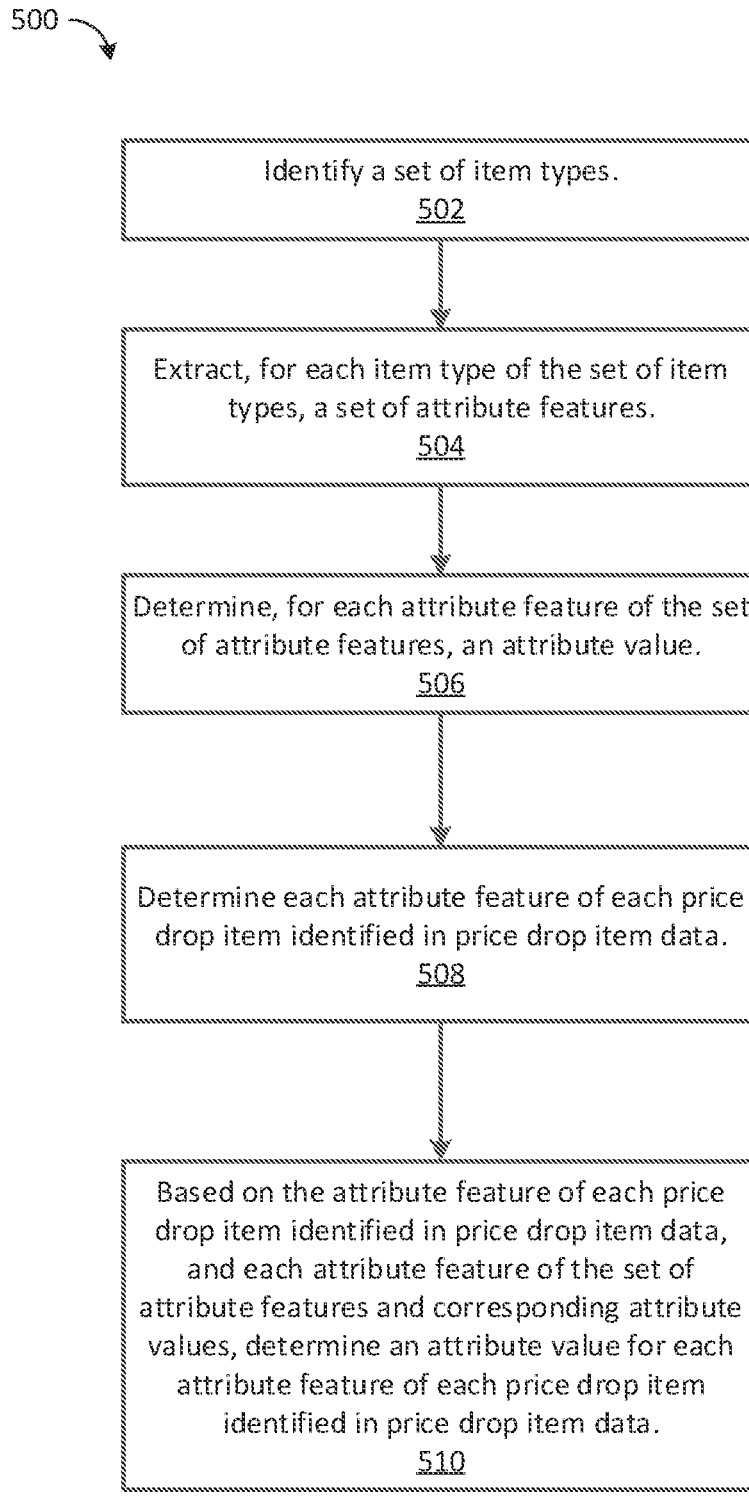
FIG. 5 illustrates an example method that can be carried out by affinity computing device 102 of FIG. 1.
Figure 6:
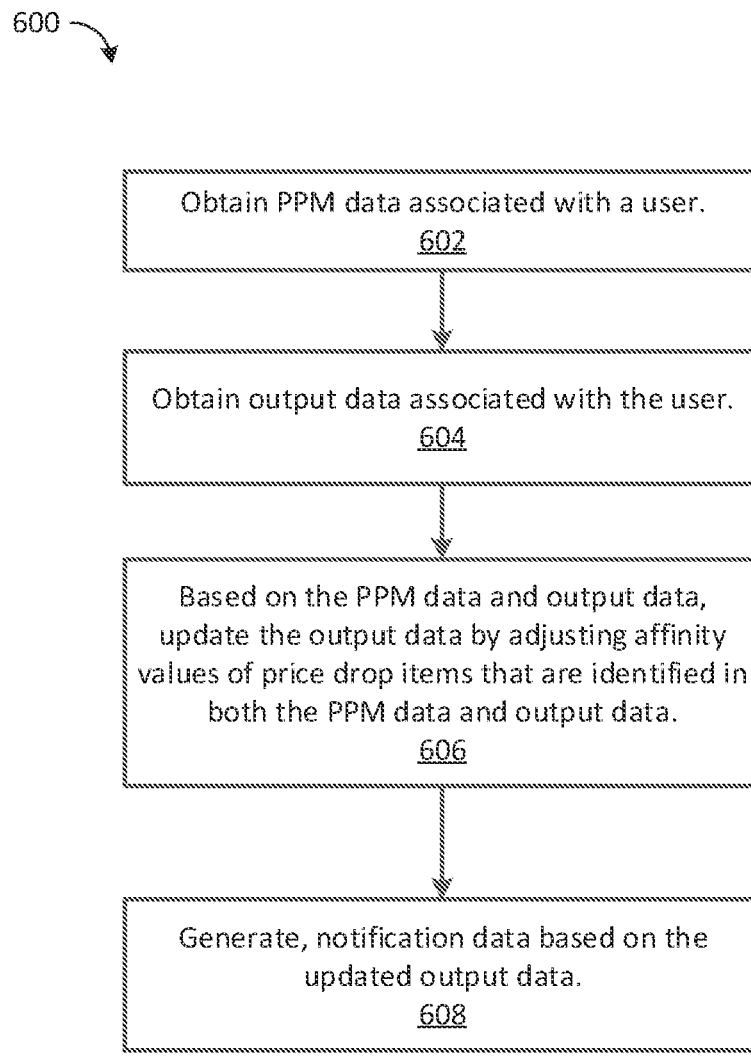
FIG. 6 illustrates an example method that can be carried out by affinity computing device 102 of FIG. 1.

FIG. 4 illustrates an example method that can be carried out by the affinity computing device 102 of FIG. 1. FIG. 5 illustrates an example method that can be carried out by affinity computing device 102 of FIG. 1. FIG. 6 illustrates an example method that can be carried out by affinity computing device 102 of FIG. 1. FIG. 7 illustrates an example method that can be carried out by affinity computing device 102 of FIG. 1. In describing an example method of FIGS. 4-7 reference is made to elements of FIG. 1-3 for purpose of illustrating a suitable component for performing a step or sub-step being described.

With reference to example method 400 of FIG. 4, during a chat interface, affinity computing device 102 may, obtain session data of a user (402). In some examples, the session data may include a user identifier of the user and a timestamp associated with the chat session. In various instances, the timestamp included with the user session data of the user may be indicative of when the chat interface was initiated by the user. In some implementations, affinity computing device 102 may obtain session data of the user from web server 104. In such implementations, the chat interface may be initiated by the user and be provided by a website of an ecommerce entity hosted by web server 104. In other implementations, affinity computing device 102 may obtain session data of the user from a mobile application executing on a mobile computing device (e.g., mobile computing device 110, 112 or 114). In such implementations, the chat interface may be initiated by the user and be provided by the mobile computing device of the user.

Additionally, affinity computing device 102 may obtain a first set of data identifying a set of price drop items associated with the chat session (404). In some implementations, affinity computing device 102 may obtain the first set of data or price drop item data 345G based on a timestamp of session data of a user. As described herein the timestamp may be indicative of when a chat session was initiated.

For example, affinity computing device 102 may execute user-item affinity engine 308 to obtain price drop item data 345G based on the timestamp associated with the initiation of the chat interface. In such an example, price drop item data 345G may identify one or more items identified in catalog data 345 that are associated with a price drop event (as herein also described price drop items) and a type of price drop event. Additionally, the price drop event may be associated with a time interval associated with the timestamp. For instance, the timestamp may indicate that a user may have initiated a chat interface on Nov. 1, 2021. As such, the items identified in the price drop item data 345G may be associated with a reduction in price event, a roll back event and/or a clearance event that includes Nov. 1, 2021.

Moreover, affinity computing device 102 may obtain a second set of data identifying a set of attribute values associated with one or more attribute features of each item type (406). In some implementations, affinity computing device 102 may execute user-item affinity engine 308 to obtain the second set of data or preference data 324 based on a user identifier of the user who initiated the chat interface. Further, affinity computing device 102 may implement a first set of operations that generate a third set of data, based on the first set of data and the second set of data (408). In some examples, affinity computing device 102 may execute user-item affinity engine 308 to implement the first set of operations. Additionally, executed user-item affinity engine 308 may apply a trained and validated machine learning model to the first set of data and the second set of data to generate the third set of data or output data 326A. In other examples, the third set of data may include affinity value data or data identifying affinity values for one or more price drop items identified in the first set of data or priced drop item data 345G. Additionally, the affinity values may characterize a likelihood of an occurrence of a purchase event between a corresponding user and the corresponding identified price drop item.

For example, the trained and validated machine learning model may implement the first set of operations to identify, based on catalog data 345 associated with each price drop item identified in price drop item data 345G or first set of data associated with the timestamp of the initiation of the chat interface, attribute features for each of the identified price drop items. Additionally, the trained and validated machine learning model may implement the first set of operations to, based on the attribute feature data 324A and corresponding attribute value data 324B of preference data 324 of the user and the determine attribute feature for each of the price drop items, determine attribute values for each attribute feature associated with each of the price drop items. For instance, preference data 324, including attribute feature data 324A and corresponding attribute value data 324B, associated with a first user, may include data elements identifying a first attribute feature associated with a first brand and corresponding first attribute value, a second attribute feature associated with a first item type and corresponding second attribute value, and a third attribute feature associated with a second item type and corresponding third attribute value. Additionally, the determined attribute features of a first price drop item identified in the price drop item data 345G may include a fourth attribute feature, a fifth attribute feature and a sixth attribute feature. Moreover, the trained and validated machine learning model may implement the first set of operations to determine whether any of the identified attribute features of preference data 324 match the determined attribute features of the price drop items identified in price drop item data 345G associated with the timestamp associated with an initiation of a chat interface. In such an example, the trained and validated machine learning model may determine whether the first attribute feature, second attribute feature or third attribute feature may match any of the fourth attribute feature, fifth attribute feature or sixth attribute feature of the first price drop item. If there is a match, the trained and validated machine learning model may determine that the corresponding affinity value of the matched attribute feature of the preference data 324 may be associated with the determined attribute feature of the price drop item of the price drop item data 345G. Following the example, if the trained and validated machine learning model determines the first attribute feature of preference data 324 of the user matches the fifth attribute feature of the first price drop item, then the trained and validated machine learning model may associate the attribute value of the first attribute feature to the fifth attribute feature.

Moreover, the trained and validated machine learning model may implement the first set of operations to generate an affinity value for each of the price drop items identified in the price drop item data 345G by aggregating each attribute value of each attribute feature of the particular price drop item. That way, the trained and validated machine learning model may generate the third set of data or output data 326A that includes the generated affinity values of the one or more identified price drop items.

Further, affinity computing device 102 may obtain a fourth set of data identifying a set of items and a score of each item of the set of items (410). In some implementations, affinity computing device 102 may execute merging engine 310 to obtain previous purchase model (PPM) data 327 or the fourth set of data associated with the user identifier of the user who initiated the chat interface. In various examples, PPM data 327 may identify, for each user or customer associated with an online platform, such as a website of an ecommerce entity hosted by web server 104, one or more items (e.g., an item identifier corresponding to each of the one or more items) the associated customer previously purchased. In some examples, PPM data 327 may include attribute feature data (e.g., based on catalog data 345, such as, item ID 345A, item brand 345B, item type 345C, item description 345D, item options 345E, and item price 345F) Further, PPM data 327 may include score data, characterizing a score for each of the one or more items. The score may characterize a likelihood of a purchase event (e.g., an actual purchase by the corresponding user) occurring of the corresponding item within a future interval.

Based on the third set of data and the fourth set of data, affinity computing device 102 may implement a second set of operations to generate a fifth set of data (412). In some implementations, executed merging engine 310 may implement the second set of operations that generate a fifth set of data based on the third set of data and the fourth set of data. For example, executed merging engine 310 may determine whether any of the price drop items identified in output data 326A or the third set of data are identified in the fourth set of data or PPM data 327. For instance, executed merging engine 310 may determine whether any of the price drop items identified in output data 326A are identified in PPM data 327 by comparing the determined attribute features, such as item ID data 345A, of each price drop item identified in output data 326A with the attribute features of attribute feature data, such as item ID data 345A, of each item identified in PPM data 327). Further, for any price drop items identified in output data 326A that match the items identified in PPM data 327, executed merging engine 310 may boost or adjust affinity values associated with price drop items that have matched to items identified in PPM data 327.

In some examples, executed merging engine 310 may boost or adjust the affinity value of a price drop item that has matched to an item identified in PPM data 327 based on score data associated with the item identified in PPM data 327 that matches the price drop item. In some instances, executed merging data 310 may generate a second set of output data 326A or the fifth set of data (not shown in FIG. 3) including the boosted or adjusted affinity value of each price drop item identified in output data 326A that matches an item in PPM data 327. In such instances, the second set of output data 326A may further identify the remaining price drop items in the output data 326A that did not have a matching item identified in PPM data 327, and may further include associated affinity value.

In various examples, affinity computing device 102 may generate notification data including instructions based on the second set of output data 326A. For example, based on the second set of output data 326A, affinity computing device 102 may execute notification engine 312 to generate the notification data as described herein.

With reference to example method 500 of FIG. 5, affinity computing device 102 may, for at least a first user of a plurality of users, identify a set of item types (502), based on the transaction data 321 of the first user. In some examples, affinity computing device 102 may execute extraction engine 304 to obtain from user database 320, transaction data 321 associated with a user (e.g., user of mobile computing device 110). Additionally, executed extraction engine 304 may extract, from transaction data 321 of the user, data characterizing items that user may have purchased. Additionally, executed extraction engine 304 may, based on the extracted data characterizing items the user may have purchased, determine an item type or category each of the items may be associated with.

Additionally, affinity computing device 102 may, extract, for each item type of the set of item types, a set of attribute features (504). For example, executed extraction engine 304 may extract, from the transaction data 321 of a first user, attribute feature data 324A. In some examples, attribute feature data 324A may characterize a set of attribute features associated with each of the items that the user may have purchased. Additionally, the attribute features may be associated with one or more user-type preferences. In such implementations, the attribute feature data 324A may indicate which of the user-type preferences each of the extracted attribute features are associated with.

Moreover, affinity computing device 102 may determine, for each attribute feature of the set of attribute features, an attribute value (506). For example, executed attribute affinities engine 306 may generate, for each item type, attribute value data 324B based on attribute feature data 324A. Attribute value data 324B may include an attribute value for each attribute feature identified in attribute feature data 324A associated with the user. Additionally, the attribute value may characterize a likelihood the user may purchase a particular item or particular item type with a corresponding attribute feature.

Further, affinity computing device 102 may determine each attribute feature of each price drop item identified in price drop item data 345G (508). In some examples, affinity computing device 102, may execute attribute affinities engine 306 to utilize catalog data 345 to determine one or more attribute features for each of the one or more identified price drop items, such as item descriptions 345D, item price 345F, and/or item type 345C (e.g., based on matching item identifiers of each of the one or more items and item identifiers of each of the one or more identified price drop items). That way, based on the attribute feature of each price drop item identified in price drop item data, and each attribute feature of the set of attribute features and corresponding attribute values, affinity computing device 102 may determine an attribute value for each attribute feature of each price drop item identified in price drop item data (510). In some examples, executed user-item affinity engine 308 may apply a trained and validated machine learning model to the determined attribute feature(s) of each price drop item identified in the price drop item data, and the attribute feature data 324A and corresponding attribute value data 324B to determine, for each attribute feature of the one or more identified price drop items, a corresponding attribute value.

With reference to example method 600 of FIG. 6, affinity computing device 102 may, obtain PPM data associated with a user (602). In various examples, the user may have initiated a chat interface. Additionally, affinity computing device 102 may execute merging engine 310 to obtain the PPM data 327 associated with the user identifier of the user who initiated the chat interface.

Additionally, affinity computing device 102 may obtain output data 326A associated with the user (604). In some examples, affinity computing device 102 may execute merging engine 310 to obtain output data 326A identifying one or more price drop items associated with the user identifier of a user who initiated the chart interface. Further, the output data 326A may include affinity value data 324B identifying an affinity value for each of the one or more price drop items.

Moreover, affinity computing device 102 may update the output data 326A based on the PPM data 327 (606). In some examples, executed merging engine 310 may adjust affinity values of price drop items that are identified in both the PPM data 327 and output data 326A. For example, executed merging engine 310 may determine whether any of the price drop items identified in output data 326A are identified in the PPM data 327. For instance, executed merging engine 310 may determine whether any of the price drop items identified in output data 326A are identified in PPM data 327 by comparing the determined attribute features, such as item ID data 345A, of each price drop item identified in output data 326A with the attribute features of attribute feature data, such as item ID data 345A, of each item identified in PPM data 327). Further, for any price drop items identified in output data 326A that match the items identified in PPM data 327, executed merging engine 310 may boost or adjust affinity values associated with price drop items that have matched to items identified in PPM data 327.

In some examples, executed merging engine 310 may boost or adjust the affinity value of a price drop item that has matched to an item identified in PPM data 327 based on score data associated with the item identified in PPM data 327 that matches the price drop item. In some instances, executed merging engine 310 may update affinity values of price drop items identified in output data 326A of a user that have matched to items identified in PPM data 327 of the user based on score data of the corresponding matching item identified in PPM data 327.

In various examples, affinity computing device 102 may generate notification data including instructions based on the updated output data 326A (608). For example, based on the updated output data 326A, affinity computing device 102 may execute notification engine 312 to generate the notification data as described herein.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   at least one processor; and
   a memory resource storing instructions, that when executed by the at least one processor, causes the at least one processor to:
   during a chat session of a first user, obtain, from a computing device of the first user, session data associated with the chat session and the first user, the chat session being conducted via a chat interface on the computing device of the first user and initiated by the first user logging into the chat interface to initiate the chat session;
   obtain a first set of data identifying a set of price drop items associated with the chat session;
   update the set of price drop items to generate an updated set of price drop items based on:
      a rejection event where the first user rejected one or more items that were recommended to the first user and are in the set of price drop items,
      a first time interval associated with the rejection event, and
      a timestamp associated with an initiation of the chat session;
   obtain a second set of data associated with the first user, the second set of data identifying a set of attribute values associated with one or more attribute features of each item type of a plurality of item types;

based on the first set of data and the second set of data, implement a first set of operations that generate a third set of data, the third set of data including an affinity value for each item of the updated set of price drop items, wherein implementing the first set of operations includes, for each price drop item of the updated set of price drop items:
  identifying attribute features of the price drop item,
  determining an attribute value associated with each of the attribute features of the price drop item, based on the attribute values of the one or more attribute features of each item type,
  determining weighting values corresponding to each respective attribute value of each identified attribute feature of the price drop item, the determination of the weighting values including:
    determining, for an item type, a plurality of items that belong to the item type and were added to cart by the first user in response to queries submitted by the first user,
    determining, for each of the plurality of items, an added-to-cart frequency of the item being added to cart by the first user, and
    generating a weighting value for each attribute value of each attribute feature of the plurality of items, based on a comparison of the added-to-cart frequencies of the plurality of items;
  generating the affinity value by aggregating all attribute values associated with the identified attribute features of the price drop item and based on the determined weighting values corresponding to each respective attribute value of each associated attribute feature of the price drop item;
obtain a fourth set of data identifying a set of items and a score for each item of the set of items, the score characterizing a likelihood the first user will purchase the corresponding item of the set of items during a future time interval;
generate, by implementing a second set of operations and based on the third set of data and the fourth set of data, a fifth set of data that identifies one or more recommended items from the updated set of price drop items, wherein implementing the second set of operations includes incorporating the score for each item of the set of items to the affinity value for each matching item of the updated set of price drop items;
generate notification data, the notification data including instructions configured to generate a recommendation notification on the chat interface, the notification data including instructions that specify the identified one or more recommended items and instructions to generate and present content items associated with the identified one or more recommended items on the chat interface, the content items including respective selectable elements that, when selected or interacted with, cause the associated recommended item to be added to an electronic shopping cart; and
transmit, to the computing device of the first user, the notification data to cause the notification recommendation to be generated and presented to the user on the chat interface.

2. The system of claim 1, wherein the fourth set of data is based on transaction data of the first user.

3. The system of claim 1, wherein the fifth set of data identifies at least one price drop item that has been previously purchased.

4. The system of claim 3, wherein the fifth set of data further identifies an affinity value score associated with the at least one price drop item, the affinity value score characterizing a likelihood of an occurrence of a purchase event between a customer and the corresponding at least one price drop item and a likelihood that the purchase event will occur during the future time interval.

5. The system of claim 1, wherein the affinity value characterizes a likelihood of an occurrence of a purchase event between a customer and the corresponding price drop item.

6. The system of claim 1, wherein the first set of operations includes: ranking each of the updated set of price drop items based on the corresponding affinity value of each price drop item of the updated set of price drop items.

7. The system of claim 1, wherein the second set of operations includes: based on the fourth set of data, identifying one or more price drop items of the updated set of price drop items that have been previously purchased; and based on the fourth set of data, updating the affinity value of each of the one or more price drop items.

8. A computer-implemented method comprising:
  during a chat session of a first user, obtaining, from a computing device of the first user, session data associated with the chat session and the first user, the chat session being conducted via a chat interface on the computing device of the first user and initiated by the first user logging into the chat interface to initiate the chat session;
  obtaining a first set of data identifying a set of price drop items associated with the chat session;
  updating the set of price drop items to generate an updated set of price drop items based on:
    a rejection event where the first user rejected one or more items that were recommended to the first user and are in the set of price drop items,
    a first time interval associated with the rejection event, and
    a timestamp associated with an initiation of the chat session;
  obtaining a second set of data associated with the first user, the second set of data identifying a set of attribute values associated with one or more attribute features of each item type of a plurality of item types;
  based on the first set of data and the second set of data, implementing a first set of operations that generate a third set of data, the third set of data including an affinity value for each item of the updated set of price drop items, wherein implementing the first set of operations includes, for each price drop item of the updated set of price drop items:
    identifying attribute features of the price drop item,
    determining an attribute value associated with each of the attribute features of the price drop item, based on the attribute values of the one or more attribute features of each item type,
    determining weighting values corresponding to each respective attribute value of each identified attribute feature of the price drop item, the determination of the weighting values including:
      determining, for an item type, a plurality of items that belong to the item type and were added to cart by the first user in response to queries submitted by the first user,
      determining, for each of the plurality of items, an added-to-cart frequency of the item being added to cart by the first user, and generating a weighting value for each attribute value of each attribute feature of the plurality of items, based on a comparison of the added-to-cart frequencies of the plurality of items;

generating the affinity value by aggregating all attribute values associated with the identified attribute features of the price drop item and based on the determined weighting values corresponding to each respective attribute value of each associated attribute feature of the price drop item;

obtaining a fourth set of data identifying a set of items and a score for each item of the set of items, the score characterizing a likelihood the first user will purchase the corresponding item of the set of items during a future time interval;

generating, by implementing a second set of operations and based on the third set of data and the fourth set of data, a fifth set of data that identifies one or more recommended items from the updated set of price drop items, wherein implementing the second set of operations includes incorporating the score for each item of the set of items to the affinity value for each matching item of the updated set of price drop items;

generating notification data, the notification data including instructions configured to generate a recommendation notification on the chat interface, the notification data including instructions that specify the identified one or more recommended items and instructions to generate and present content items associated with the identified one or more recommended items on the chat interface, the content items including respective selectable elements that, when selected or interacted with, cause the associated recommended item to be added to an electronic shopping cart; and transmitting, to the computing device of the first user, the notification data to cause the notification recommendation to be generated and presented to the user on the chat interface.

9. The computer-implemented method of claim 8, wherein the fourth set of data is based on transaction data of the first user.

10. The computer-implemented method of claim 8, wherein the fifth set of data identifies at least one price drop item that has been previously purchased.

11. The computer-implemented method of claim 10, wherein the fifth set of data further identifies an affinity value score associated with the at least one price drop item, the affinity value score characterizing a likelihood of an occurrence of a purchase event between a customer and the corresponding at least one price drop item and a likelihood that the purchase event will occur during the future time interval.

12. The computer-implemented method of claim 8, wherein the affinity value characterizes a likelihood of an occurrence of a purchase event between a customer and the corresponding price drop item.

13. The computer-implemented method of claim 8, wherein the first set of operations includes: ranking each of the updated set of price drop items based on the corresponding affinity value of each price drop item of the updated set of price drop items.

14. A non-transitory computer readable medium storing instructions, that when executed by at least one processor, causes a system to:

during a chat session of a first user, obtain, from a computing device of the first user, session data associated with the chat session and the first user, the chat session being conducted via a chat interface on the computing device of the first user and initiated by the first user logging into the chat interface to initiate the chat session;

obtain a first set of data identifying a set of price drop items associated with the chat session;

update the set of price drop items to generate an updated set of price drop items based on:
   a rejection event where the first user rejected one or more items that were recommended to the first user and are in the set of price drop items,
   a first time interval associated with the rejection event, and
   a timestamp associated with an initiation of the chat session;

obtain a second set of data associated with the first user, the second set of data identifying a set of attribute values associated with one or more attribute features of each item type of a plurality of item types;

based on the first set of data and the second set of data, implement a first set of operations that generate a third set of data, the third set of data including an affinity value for each item of the updated set of price drop items, wherein implementing the first set of operations includes, for each price drop item of the updated set of price drop items:
   identifying attribute features of the price drop item,
   determining an attribute value associated with each of the attribute features of the price drop item, based on the attribute values of the one or more attribute features of each item type,
   determining weighting values corresponding to each respective attribute value of each identified attribute feature of the price drop item, the determination of the weighting values including:
      determining, for an item type, a plurality of items that belong to the item type and were added to cart by the first user in response to queries submitted by the first user,
      determining, for each of the plurality of items, an added-to-cart frequency of the item being added to cart by the first user, and
      generating a weighting value for each attribute value of each attribute feature of the plurality of items, based on a comparison of the added-to-cart frequencies of the plurality of items;
   generating the affinity value by aggregating all attribute values associated with the identified attribute features of the price drop item and based on the determined weighting values corresponding to each respective attribute value of each associated attribute feature of the price drop item;

obtain a fourth set of data identifying a set of items and a score for each item of the set of items, the score characterizing a likelihood the first user will purchase the corresponding item of the set of items during a future time interval;

generate, by implementing a second set of operations and based on the third set of data and the fourth set of data, a fifth set of data that identifies one or more recommended items from the updated set of price drop items, wherein implementing the second set of operations includes incorporating the score for each item of the set of items to the affinity value for each matching item of the updated set of price drop items;

generate notification data, the notification data including instructions configured to generate a recommendation notification on the chat interface, the notification data including instructions that specify the identified one or more recommended items and instructions to generate and present content items associated with the identified one or more recommended items on the chat interface, the content items including respective selectable elements that, when selected or interacted with, cause the associated recommended item to be added to an electronic shopping cart; and transmit, to the computing device of the first user, the notification data to cause the notification recommendation to be generated and presented to the user on the chat interface.

* * * * *